Patented Feb. 13, 1934

1,947,416

UNITED STATES PATENT OFFICE 1,947,416

DIENE RESINS AND METHODS OF MAKING THE SAME

Adolf Heck, Kansas City, Mo., assignor to Cook Paint & Varnish Company, Kansas City, Mo., a corporation of Delaware No Drawing. Application July 16, 1931
Serial No. 551,293

3 Claims. (Cl. 260—8)

This invention relates to diene resins and methods of making the same; and it comprises as a new material for use in lacquers, varnishes and paints, a pale, elastic body produced by the co-condensation and polymerization of a mixture of phthalic anhydrid, glycerin and distilled fatty acids of castor oil, said distilled fatty acids consisting of or comprising a diene unsaturated fatty acid containing 18 carbon atoms and presumed to be octadecadiene (9–11), acid (1), said resin frequently containing also a co-condensed drying oil; and it further comprises a method of making such a resin wherein mixtures of phthalic anhydrid, glycerin and distilled fatty acids from castor oil are heated together, in the presence or absence of a drying oil or of additional fatty acids from another source, heating being continued until the mixture becomes clear and, on cooling, solidifies to a product, free, or nearly free, of tackiness; all as more fully hereinafter set forth and as claimed.

Synthetic resins are made in many ways and some of these ways comprise heating mixtures containing a plurality of hydroxyl groups of different character until condensation and polymerization take place; as in heating phenol alcohols (phenol formaldehyde mixtures) and mixtures of glycerin and phthalic anhydrid.

It is to the latter class of resins that the present invention appertains. Phthalic acid (phthalic anhydrid) is a polybasic acid and glycerin is a polyvalent alcohol. On heating mixtures of the two in certain proportions, in lieu of obtaining bodies of a fatty nature, that is, of ordinary glycerid type, there are obtained partially esterified reaction products, capable of condensing together and of polymerizing to form resinous materials. Other polyvalent alcohols, such as glycol, can be used in lieu of glycerin; and even sugars have been suggested. Other polybasic acids, such as sebacic acid, malic acid, etc., may be substituted for phthalic acid; but, on the whole, phthalic anhydrid and glycerin give the best results and these materials are here used. It is found in practice that resins improved for some purposes are obtained by using an additional or adjunctive acid with the phthalic acid. By using a straight chain acid, such as oleic acid, in addition to the phthalic acid, mixed esters may be obtained in the esterification which, by reason of their fatty component, blend better with the fatty drying oils.

One difficulty with these resins made by partial esterification of glycerin and a polybasic acid, some types of which are commercially known as "glyptal", is their limited range of solubility. Some are soluble in one solvent and some in another, making their general use in blending with copals, pyroxylin, etc., difficult. In the present invention, a resin is produced of a more general range of solubility and better adapted for blending purposes in making lacquers, varnishes and paints; it being compatible with most of the other coating materials. The new resin has new and advantageous drying properties.

To this end, advantage is taken of one of the diene acids which can be made in excellent yield by vacuum distillation of castor oil fatty acids under proper conditions. This acid is used as an adjunctive acid in making resins of the phthalic anhydrid-glycerin type and adds new and valuable properties. It has an empirical formula of $C_{18}H_{32}O_2$ and is doubly unsaturated, the unsaturation being of the conjugate double bond or diolefin type. Using the Geneva nomenclature, it is octadecadiene (9–11), acid (1).

As a diene, it is capable of condensing to a rubber-like consistency and as an unsaturated body, it is susceptible of ready oxidation. Both properties come into play in its use here.

The fatty acids in question can be readily made by heating technical castor oil fatty acids to a temperature of about 200° C. and distilling in vacuo, advantageously in a stream of $CO_2$. Molecular rearrangement takes place with the formation of $H_2O$, as well as of the unsaturated acid here wanted. By operating at a pressure of 30 mm. and a temperature of 260–270° C., a distillate is obtained which is water clear, or nearly so, and is light colored. The crude distillate, after drying, may be here employed. The acid produced in distillation has many interesting properties not here important; among them, its ready esterification with glycerin at a temperature of 200° C. to form a triglycerid having properties intermediate those of wood oil and linseed oil. It is not here used to make a triglycerid; a product only partially esterified, as regards the glycerin, being made.

In a typical embodiment of the present invention, making a resin not including a drying oil, 100 parts by weight of phthalic anhydrid, 50 parts of commercial or dynamite glycerin and 100 parts of distilled fatty acid are mixed and heated to and at 180–220° C. until the mixture becomes clear and, on cooling, is nearly free of tackiness. Free access of air should not be permitted during the heating operation. The resulting resin is very pale, having much less color than the ordinary phthalic acid-glycerin type resins. The resin is elastic and is soluble in coal tar hydrocarbons, such as benzene, toluene and the xylenes and ketones. The solutions may be thinned with alcohols, such as ethyl alcohol. While it is not directly soluble in petroleum oils or turpentine, either can be used as a thinner for solutions in benzene, etc. The resin in a proper solvent gives a good coating composition of the type known as spirit varnish. For example, 50 parts by weight of the resin may be dissolved in 50 parts of such a solvent as ethyl acetate, acetone, etc. Benzol and toluol may be used as the solvent. Mixtures of solvents can be used to obtain special drying rates. In forming a film or coating, the varnish acts not only as a spirit varnish by evaporation of solvent, but also sets because of internal reactions of the diene component. The regular varnish driers may be used, such as cobalt, lead or manganese resinates or oleates.

In another embodiment of my invention, incorporating a drying oil into a resin, a mixture of 100 parts by weight of phthalic anhydrid, 50 parts glycerin, 50 parts of distilled fatty acid of castor oil and 50 parts linseed oil may be heated to about 230° C. until the mixture becomes clear and, on cooling, gives a resinous body nearly free of tackiness. The resin produced is more elastic and more water resistant and yellows less than the resin obtained in the first example. Its properties as a coating material are, moreover, different, since the linseed oil component gives different drying properties. The solubilities are, in general, the same as those of the simple resin made in the first example; but the solubility in petroleum hydrocarbons and turpentine is better. A desirable type of linseed oil to be used in this preparation is what is known as "linseed stand oil", a material obtained by heating varnish maker's linseed oil at 310° C. for 6 hours or longer, depending on the viscosity desired, under an atmosphere of $CO_2$.

A resin desirable for special purposes is obtained by replacing the 50 parts of linseed stand oil of the second example with 50 parts of ordinary China-wood oil. This gives a clear, elastic, nearly tack-free resin; but for general purposes, it is not as desirable as the resin made with linseed oil, since it yellows more on drying or on baking and is not as elastic. Its general properties are the same as those of the composition made with linseed oil.

The proportions of the various ingredients given in the examples given ante are convenient and give good results. Other proportions are, however, possible and are frequently useful. For example, a composition made by co-condensation of 100 parts by weight of phthalic anhydrid, 50 parts glycerin, 75 parts distilled castor oil fatty acids and 50 parts stand oil gives good results. The resulting resin is completely soluble in petroleum hydrocarbons, such naphtha, gasoline, turpentine substitute, etc., as well as in the other solvents.

Solutions of the diene resins in these petroleum solvents are often quite advantageous, as a varnish so made applied over old finishes will not have a softening or lifting action. Where a varnish made with the present diene resin is to be used over old finishes, toluol, xylol and ethyl acetate are not desirable solvents, since these bodies tend to dissolve and lift the old coating, the tendency of course increasing with their proportion in the varnish.

In the examples given, a part of the octadecadiene acid may be replaced by a corresponding amount of the fatty acids of linseed oil or of tung oil (wood oil), with production of specifically different resins.

All the resins made under the present invention are paler in hue than similar resins made without the distilled castor oil fatty acid and show much better drying properties. With the ordinary glycerin phthalic anhydrid resins, there is really no drying in the ordinary sense, when they are used as coating compositions. The glycerin and the phthalic anhydrid are brought to whatever stage of condensation and polymerization may be desired by heating and no further reaction takes place when they are used with solvents in making varnish. On the other hand, the diene structure of the distilled fatty acid, which mostly or wholly remains after the condensation, gives a drying action. Where a drying oil is used in making the composition as a triglycerid, it probably takes part in the reaction; losing part of its glycerin to the other reactants, but its general drying properties remain in the final resin.

Resins made under the present invention super-add a drying function to the ordinary film-forming functions of the ordinary glycerin-phthalic acid resins. By the use of the materials made under the present invention, it is possible to make very pale, quick-drying lacquers and varnishes having all the valuable properties of the ordinary glycerin-phthalic acid resins with characteristic and valuable properties of their own.

An excellent varnish using diene resins under the present invention can be made by dissolving 50 parts by weight of resin in 50 parts toluol. This gives a spirit varnish; a varnish which dries by direct evaporation of solvent. The rate of evaporation may be modified by substituting one of the various solvents mentioned for the toluol. Superadded to this ordinary way of producing a film is hardening by oxidation and polymerization. This may be facilitated by adding a small quantity, say, 3 to 5 per cent, of any of the ordinary varnish type liquid driers. The varnish may be sprayed, brushed or otherwise applied as a coating and the coated article may be air-dried or baked. Specifically different results are obtained where a drier is or is not used.

In making a lacquer, a solution of the diene resin in any appropriate solvent is blended in a solution of nitrocellulose or pyroxylin lacquer. Low viscosity pyroxylin may be used. The lacquer may contain the usual plasticizers and softeners, such as tricresyl phosphate, dibutyl phthalate, diamyl phthalate, castor oil, etc. Good lacquers are prepared by using a diene solution containing about 50 per cent resin with a solvent consisting of equal parts toluol and ethyl or butyl acetate. The pyroxylin may be dissolved in the same solvent combination, the solution containing 10–30 per cent solids, according to the viscosity of the nitrocellulose.

In making paints, the described diene varnish mixtures may be pigmented with any of the non-reactive pigments. In these paint compositions, it is possible to add up to 10 per cent sulfonated linseed or perilla oil to the varnish or paint without injury to the quick-drying properties. Using more than 10 per cent is practicable but, in this event, a slight precipitation may take place, giving a cloudy film. With a paint, this cloudiness is immaterial.

What I claim is:—

1. As an improvement in the manufacture of resins from phthalic anhydrid, glycerin and fatty acid to form special resins soluble in coal tar hydrocarbons, the improved process which comprises distilling castor oil fatty acids under a reduced pressure of approximately 30 mm. at temperatures of about 260 to 270° C., collecting the distilled fatty acids thus obtained, mixing between 50 and 100 parts of said distilled fatty acids with about 100 parts of phthalic anhydrid and 50 parts of glycerin, heating the mixture to between 180 and 230° C. until the mixture becomes clear continuing the heating until an elastic, light-colored, substantially non-tacky resin is obtained upon cooling and then cooling the mixture to obtain the resin, said resin being soluble in benzene, toluene and like coal tar oils.

2. The improved process of claim 1 wherein 50 parts of said distilled fatty acid are used and wherein 50 parts of linseed oil stand oil are added to the mixture prior to said heating, the mixture then being heated to 230° C., whereby a resin of improved drying qualities and of better solubility in petroleum oils and turpentine is obtained without substantially altering the other properties of said resin.

3. As an improved varnish resin, a phthalic anhydrid-glycerin-fatty acid condensation product obtainable by the process of claim 1, said condensation product being an elastic, substantially non-tacky, light-colored resin, being soluble in benzene, toluene and like coal tar oils, yielding solutions capable of being thinned with ethyl alcohol and like alcohols and with turpentine and petroleum oils, and being also soluble in ethyl acetate, acetone and similar oxygen-containing solvents, said solution giving film coatings which are capable of drying by actions including oxidation.

ADOLF HECK.